June 23, 1970 E. R. TIMMERBEIL ET AL 3,516,590
FASTENER APPLYING IMPLEMENT
Filed Sept. 26, 1967 5 Sheets-Sheet 1
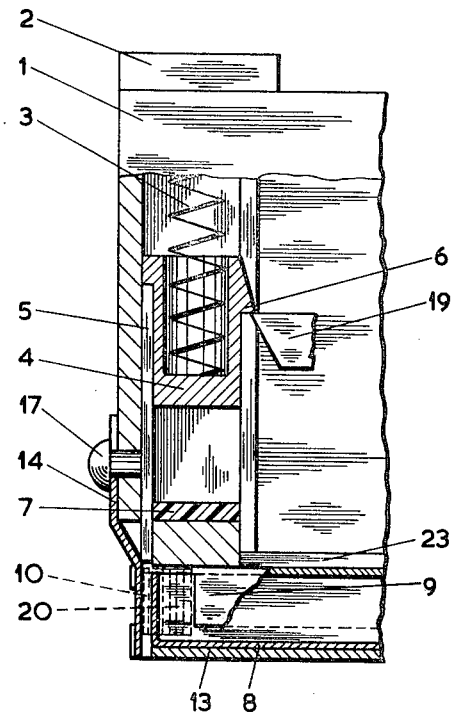
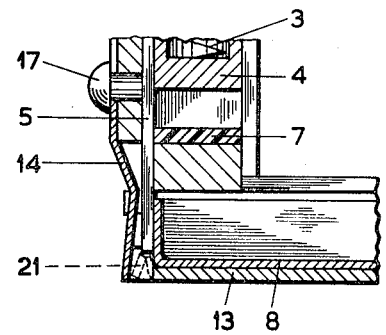
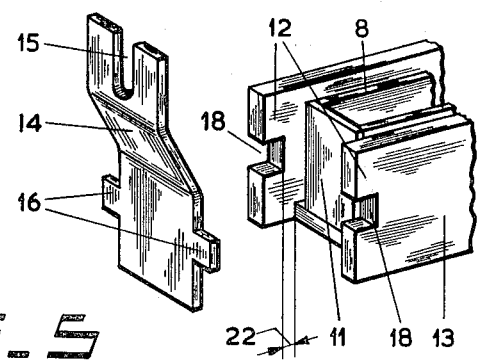
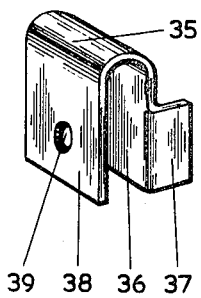
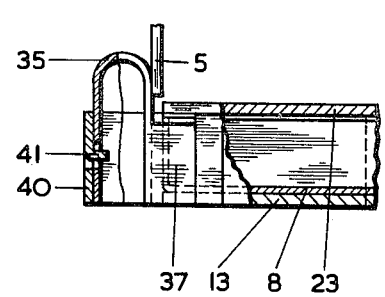
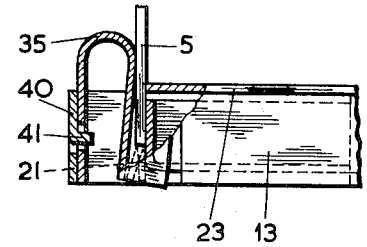

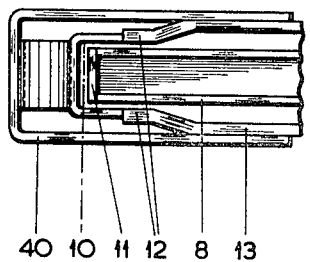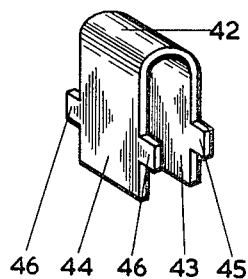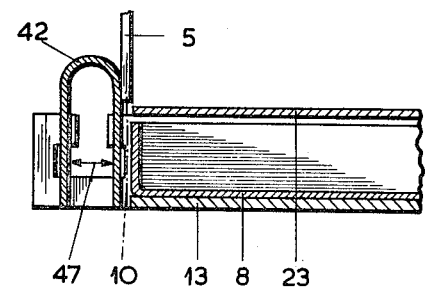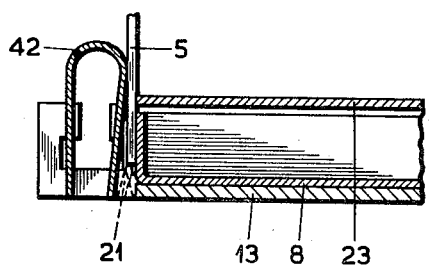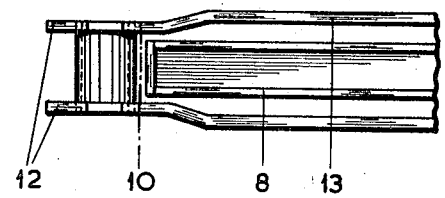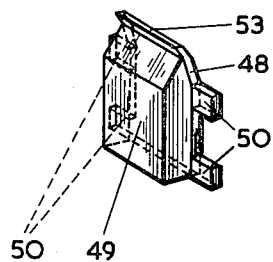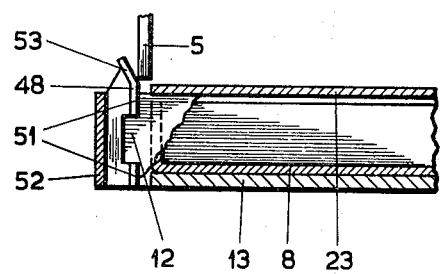

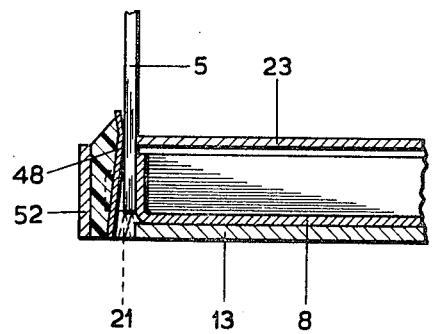
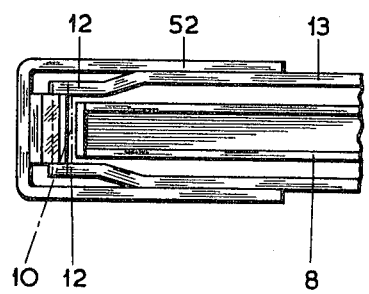
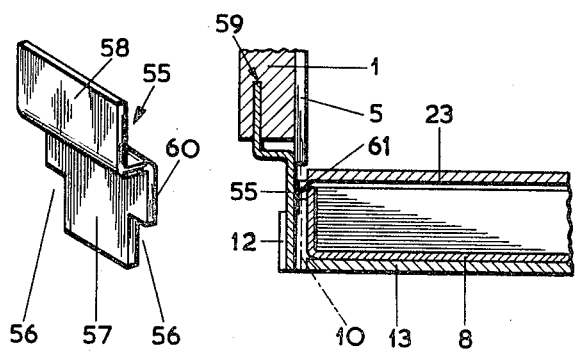
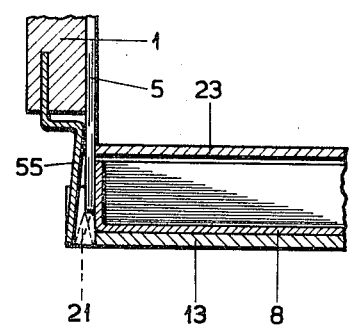
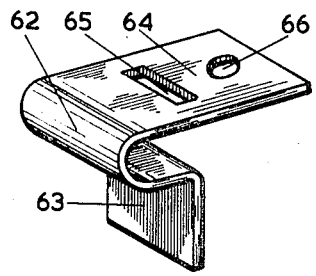
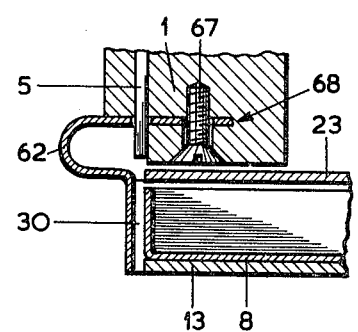
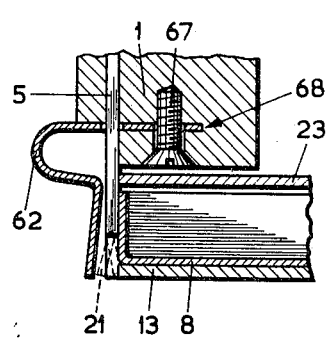

United States Patent Office

3,516,590
Patented June 23, 1970

3,516,590
FASTENER APPLYING IMPLEMENT
Ewald Rudolf Timmerbeil, Rudolf de Ruiter, and Eppo Hemmo Jeronimus, Arnhem, Netherlands, assignors to VERPA Draadindustrie N.V., Arnhem, Netherlands
Filed Sept. 26, 1967, Ser. No. 670,669
Int. Cl. B25c 5/02
U.S. Cl. 227—123                                          5 Claims

ABSTRACT OF THE DISCLOSURE

A fastener applying implement has a front plate formed by a resilient member preferably in the form of a leaf spring held in a guideway defining position such that forces keeping the front plate in its position diminish from the top of the guideway towards the outlet of the guideway to achieve the effect of self-cleaning of the guideway if the guideway should become obstructed by an improperly separated fastener.

BACKGROUND OF INVENTION

Field of invention

The present invention relates to improvements in fastener applying implements, and particularly to a unique construction of a front plate guideway defining member in such implements. The invention is applicable in principle to any type of implements of this nature independent of the type of fastener used such as nails, staples, or the like.

Prior art

In the known art there are a great variety of fastener applying implements. They all face the problem that the guideway for the fasteners may become obstructed by fasteners which are deformed before leaving the guideway and thereby jam in the guideway. This may be due to different reasons, e.g., tolerances of the fasteners, defects in the material of the fasteners, damage of the driver, insufficient spring pressure, etc. If such obstruction occurs it is first necessary to clean the guideway, and to this end many constructions are known.

It is well known to mount a front plate of a guideway by means of screws so that the front plate may be removed and a jammed fastener freed. This, however, is a time-consuming operation. If the obstruction or jamming occurs often it very soon becomes necessary to replace the driver as the existing driver becomes damaged by the jammed fasteners.

To solve the problem of damage to the driver, it is also known to use a front plate which is kept in place by a separate spring, allowing the entire front plate to move in a direction perpendicular to its plane. This construction prevents damage to the front plate and driver but, on the other hand, has a disadvantage of being rather complicated in construction and consequently costly. Moreover, it does not always prevent jamming of the staples. A further disadvantage with such known implements is that even when spring loaded front plates are used it is still necessary to loosen several parts in order to dismount the front plate and clean the guideway. In some constructions locking members are used which allow release of the spring pressure to facilitate removal of the front plate, but this still means that a special operation is necessary and this is time-consuming.

SUMMARY OF THE INVENTION

The present invention provides a front plate for a fastener applying implement which, in the case of deformation of the fasteners, resiliently gives way such that the guideway opens in the direction of movement of the driver. Due to this construction an operator can easily remove a jammed fastener by a repetitive operative stroke of the driver. Cleaning the guideway thus becomes a simple operation because it only requires another operation of the implement while not attempting to drive the subsequent fastener into an object. During this next operation the jammed fastener, together with the further separated fastener, will readily leave the implement. After such cleaning of the guideway, the implement is ready for further operation.

According to this invention, the front plate is integral with the resilient portion which is supported by the frame and keeps the front plate in its proper position. The resilient portion is positioned in such a way that the forces of this resilient portion of the front plate diminish from the top of the guideway toward its outlet opening so that the opening of the guideway is easier, closer to the outlet opening than at a higher point nearer the inlet of the guideway. Due to this arrangement forces resisting the removal of a jammed fastener diminish toward the outlet opening so that it becomes possible to remove the jammed fastener by the next operative stroke of the implement without the necessity of entirely dismounting the front plate for cleaning the guideway.

BRIEF DESCRIPTION OF THE DRAWINGS

The invention will now be further described with reference to the accompanying drawings, in which:

FIG. 1 is a longitudinal section through a main part of a fastener applying implement according to this invention;

FIG. 2 is a section similar to the lower portion of FIG. 1 with driver and front plate in a position in which a fastener is jammed in the guideway;

FIG. 3 is an exploded perspective view of the front end of the magazine and front plate in one embodiment;

FIGS. 4, 8, 12, 16 and 19 are perspective views of different embodiments of the front plate according to the invention;

FIG. 5 is a longitudinal section view of part of the magazine, guideway and driver utilizing the front plate of the FIG. 4 embodiment;

FIG. 6 is a view similar to FIG. 5 showing the operation of the front plate if a fastener in the guideway is jammed;

FIG. 7 is a top view of the magazine and guideway of FIG. 5 with the guide strip removed for the sake of clarity;

FIGS. 9, 10 and 11 are views corresponding to FIGS. 5, 6 and 7, respectively, utilizing a front plate of the type shown in FIG. 8;

FIGS. 13, 14 and 15 are views corresponding to FIGS. 5, 6 and 7, respectively, utilizing a front plate as shown in the embodiment of FIG. 12;

FIGS. 17 and 18 are views corresponding to FIGS. 5 and 6 utilizing a front plate according to the embodiment of FIG. 16;

FIGS. 19, 20 and 21 are views corresponding to FIGS. 16, 17 and 18, respectively, utilizing a front plate according to the FIG. 19 embodiment;

DESCRIPTION OF PREFERRED EMBODIMENT

Figure 22:
FIGS. 22 to 26, inclusive, are horizontal cross-sectional views showing different cross sections of the front plate.

In FIG. 1 a fastener applying implement includes a casing 1 with a screw cap 2. In the casing a spring 3, plunger 4 and a driver 5 are mounted. The plunger 4 has a cap 6. Downward movement of the plunger 4 limited by a rubber cushion 7. Staples 20 are placed on a guide rail 8 of a magazine and fed towards a guideway 10 by means not shown but well known in the art. A guide strip 23 assures that the staples are correctly guided over the guide rail 8. The guideway 10 is formed by an end surface 11 of the guide rail 8, extensions 12 of magazine 13, and the face of front plate 14, see FIG. 3.

The front plate shown in the FIGS. 1–3 embodiment is a leaf spring bent twice and having a slot 15 at its upper end and laterally extending lugs 16 at its lower end sides. The front plate 14 is secured to the front side of casing 1 by means of a rivet or screw 17. When the front plate is mounted in its position it is held under tension against magazine 13, with the lugs 16 being pressed into correspondingly formed recesses 18 in the extensions 12 of magazine 13. The depth of these recesses is such that when the lugs 16 of the front plate 14 engage the bottoms of the recesses 18, the distance between the guideway defining face of the front plate 14 and the end face 11 of the guide rail 8 corresponds to the thickness 22 of the staple 20.

To drive a staple into a workpiece, the plunger 4 is moved upwardly against the pressure of spring 3 by means of a pawl 19. The driver 5 connected to the plunger also moves upwardly. At a predetermined point selected such that the spring pressure is great enough to drive a staple into the workpiece and at which the driver 5 is moved upwardly far enough to enable a staple to leave the magazine and enter the guideway, the pawl 19 releases the cam 6 of the plunger 4, and the plunger together with the driver 5 move downwardly under the accumulated pressure of spring 3, thereby driving the staple in the guideway 10 downwardly and out through the guideway into the material or workpiece against which the implement is held.

Under normal circumstances, the guideway 10 remains closed as indicated in FIGS. 1, 5, 9, 13, 17 and 20.

However, if for some reason the staple is deformed, a relief has to be provided for the forces which then occur. Further, the deformed staple has to be removed from the guideway 10. With the implement constructed according to this invention, the foregoing can be achieved by a unique front plate construction.

As soon as transversely directed forces take place as a result of the deformation of a staple, the front plate gives way widening the guideway 10 and thus allowing for more space for the deforming or already deformed staple 21, see FIGS. 2, 6, 10, 14, 18 and 21. Due to the unique construction of the front plate, the forces applied to the deformed staple will decrease in proportion to the movement of the staple toward the outlet opening of the guideway.

The embodiment of the front plate shown in FIGS. 1, 2 and 3 is of a simple and efficient form. Many other forms, however, are possible. Other basic forms possible are shown in FIGS. 37 to 46, inclusive. These figures do not show the exact form of the front plate portion, and only partly show means for locking the front plate element in its position.

Figure 36:
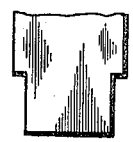
Figure 37:
FIGS. 37–46, inclusive, are also end elevation views of front plates according to various embodiments of this invention.

FIG. 37 shows a simple form of an inverted U-shaped leaf spring. The manner of connecting such a spring to the frame of the implement can be accomplished by any one of the possibilities shown in FIGS. 27, 28, 29, 31, 32, 33 and 36.

Figure 38:
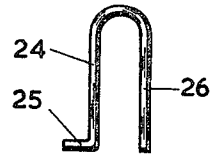

FIG. 38 shows that a left-hand leg 24 has been provided with a horizontal portion 25 for locking the element either by itself or in combination with the possibilities shown in FIGS. 31, 32, 33 and 36 to be used with the right-hand leg 26.

Figure 39:
Figure 40:
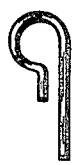
Figure 41:
Figure 42:
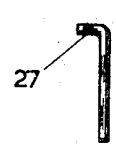

FIGS. 39, 40 and 41 show variations of the form of the leaf spring in FIG. 38.

FIGS. 42, 43, 44 and 45 show simple bent leaf springs. The connection with the frame may be accomplished by means of legs 27, 28, 29 and 30, respectively. The embodiments of FIGS. 43, 44 and 45 have further locking elements according to FIGS. 31, 32 and 36.

Figure 46:
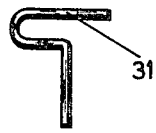

FIG. 46 shows an embodiment which can be secured solely by means of leg 31.

As can be seen from the basic forms that the front plate portion can take, the front plate resiliently hinges at the level of the top of the guideway or above, and this contributes to obtaining the desired effect.

Figure 23:
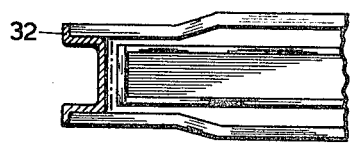
Figure 24:
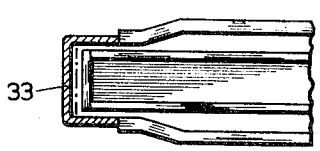
Figure 25:
Figure 26:
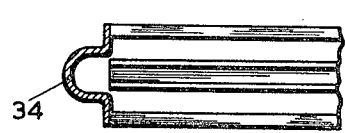
Figure 27:
FIGS. 27 to 34, inclusive, and 36 are fragmentary elevation views showing different portions of the front plate for fastening the front plate which could be applied to the embodiments of the front plate shown in FIGS. 3, 4, 8, 12, 16 and 19.
Figure 28:
Figure 29:
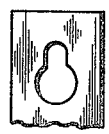
Figure 30:

It can be seen that all basic forms of the element may have different cross sections. Some possibilities are shown in FIGS. 22 to 26, inclusive. FIG. 22 shows a straight cross section lying flat against forwardly extending extensions of the magazine. FIG. 23 shows a channel-like cross section lying between extensions of the magazine and having flanges 32 abutting against these extensions. FIG. 24 shows a front plate of U-shaped cross section 33, and FIG. 25 shows a front plate of U-shaped cross section with smaller depth. FIG. 26 shows a front plate of rounded cross section 34 particularly suitable for nails.

Additional specific embodiments of the front plate arrangement will now be described. FIG. 4 shows a further embodiment which may be considered as a combination of the possibilities indicated in FIGS. 37, 27 and 24. In this figure, front plate 35 is U shaped, the guideway defining leg 36 having outwardly bent lugs 37 and the other leg 38 having a hole 39 for connecting the front plate to the frame. A protective strap 40 has been provided around the magazine 13 and has an inwardly bent hook-shaped lip 41. The lugs 37 of front plate 35 engage extensions 12 of the magazine 13. The guideway leg 36 of the front plate, the two lugs 37, and the end wall 11 form the guideway 10. The front plate 35 is kept in place by the lip 41 extending through the hole 39 and due to the spring bias of the U-shaped element. Insertion of the front plate element 35 can be accomplished in a simple way by movement of the element from below the frame into the opening of the frame by bending the element.

FIG. 6 shows how the front plate element 35 of the FIG. 4 embodiment deforms in the case of an obstruction such as a jammed staple in the guideway.

Figure 31:
Figure 32:
Figure 33:
Figure 34:
Figure 35:
FIG. 35 is an end elevation view of a portion of the front plate shown in FIG. 34.

FIG. 8 is another embodiment which can be considered a combination of the possibilities indicated in FIGS. 31 and 37. In this case, the front plate element 42 is of inverted U-shaped form having two legs 43 and 44, each with laterally extending lugs 45 and 46, respectively. The sidewall extensions 12 of magazine 13 are provided with recesses 47 for accommodating the lugs 45 and 46. This front plate element is kept in place by its own spring bias and by the engagement of the lugs in the recesses.

FIG. 12 is a further embodiment, and in this embodiment the front plate is formed by a stiff metal plate 48 covered at its rear side by a block 49 of resilient material, e.g., rubber. The plate 48 has outwardly extending lugs 50 which cooperate with recesses 51 in the sidewalls of the magazine. The front plate is held in place by a bail 52. The plate 48 has an outwardly inclined upper edge portion 53, and the rubber block portion extends upwardly above the upper level of the magazine to ensure that the guideway will flair outwardly in the case of an obstruction as shown in FIG. 14.

Figure 43:
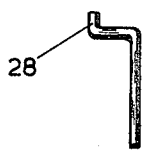
Figure 44:
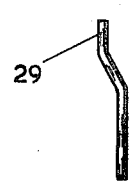
Figure 45:
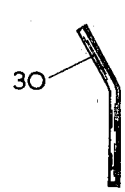

The embodiment shown in FIG. 16 may be considered a combination of the possibilities shown in FIGS. 22, 36 and 43. This embodiment shows a front plate element 55 formed by a leaf spring bent twice at right angles. At its lower end the leaf spring has recesses 56 engaging recesses at the side wall extensions 12 of magazine 13. The smaller lower portion 57 is positioned between the side walls of the magazine and forms the guideway defining portion of the front plate. This front plate is kept in place by holding the upper portion 58 in a slot 59 of casing 1 and by keeping portions 60 under tension within recesses 61 of the magazine side walls.

FIGS. 19, 20 and 21 show an embodiment which may be considered to be a combination of possibilities indicated in FIGS. 46 and 22. In this embodiment, front plate 62 is formed by a horizontal U-shaped portion having one leg 63 bent downwardly to form the guideway defining portion of the front plate and the other leg 64 extending horizontally. The horizontal leg 64 has a longitudinal slot 65 as well as a circular hole 66. Slot 65 enables the driver 5 to pass therethrough. Hole 66 is for the purpose of securing the front plate element to the casing by means of screw 67. The leg 64 is held in a groove 68 in the casing 1.

In view of the foregoing, it is readily understood that many variations are possible within the spirit and scope of this invention as defined by the appended claims.

We claim:

1. A fastener applying implement comprising: a frame member, a magazine member for fasteners within the frame member, a guideway for the fasteners adjacent the end of the magazine and extending perpendicular to the end of the magazine, a driver movable through the guideway, the guideway and driver being of such shape that only one fastener at a time can be driven out of the guideway during each operative stroke of the driver, the guideway having a U-shaped front plate with a portion thereof defining more than one side of the guideway and including an integral resilient portion supported from one of the members, the resiliency of the integral resilient portion biasing the guideway defining portion to a position adjacent the end of the magazine to define the guideway, the resilient portion and guideway defining portion positioned such that the biasing forces holding the guideway defining portion in normal position diminish from the top of the guideway towards its outlet opening and the guideway defining portion effectively hinges about a point at the top of the guideway or above, the resilient portion being supported by one of the members so as to allow for movements of the front plate away from the magazine to open the guideway, but restrained in the direction of movement of the driver.

2. A fastener applying implement as in claim 1 wherein the front plate is in the form of a leaf spring secured to the frame member.

3. A fastener as defined in claim 2 wherein the leaf spring is secured to the frame above the level of the magazine.

4. A fastener applying implement as in claim 1 wherein the front plate is formed by one leg of a bent leaf spring, another leg of the bent leaf spring extending substantially horizontally and attached to the frame member.

5. A fastener applying implement comprising: a frame member, a magazine member for fasteners within the frame member, a guideway for the fasteners adjacent the end of the magazine and extending perpendicular to the end of the magazine, a driver movable through the guideway, the guideway and driver being of such shape that only one fastener at a time can be driven out of the guideway during each operative stroke of the driver, the guideway having a front plate with a portion thereof defining at least one side of the guideway, said front plate being formed by one leg of an inverted U-shaped leaf spring having an integral resilient portion and supported with both legs against opposite abutments of one of the members, at least one leg of the U-shaped leaf spring having transversely extending locking lugs, the resiliency of the integral resilient portion biasing the guideway defining portion to a position adjacent the end of the magazine to define the guideway, the resilient portion and guideway defining portion positioned such that the biasing forces holding the guideway defining portion in normal position diminish from the top of the guideway towards its outlet opening and the guideway defining portion effectively hinges about a point at the top of the guideway or above, and said transversely extending locking lugs cooperating with corresponding portions of the member to lock the U-shaped leaf spring against displacements in the direction of movement of the driver and allowing the front plate forming leg to move resiliently in a direction away from the guideway.

References Cited

UNITED STATES PATENTS

| | | | |
|---|---|---|---|
| 2,117,741 | 5/1938 | Polzer | 227—123 XR |
| 2,160,514 | 5/1939 | Polzer | 227—123 XR |
| 2,300,277 | 10/1942 | Hansen | 227—123 |
| 2,853,707 | 9/1958 | Juilfs | 227—123 |
| 3,076,195 | 2/1963 | Jopp | 227—123 |

GRANVILLE Y. CUSTER, JR., Primary Examiner